United States Patent
Hashizume et al.

(10) Patent No.: US 7,639,442 B2
(45) Date of Patent: Dec. 29, 2009

(54) METHODS AND APPARATUS TO PERFORM HARD-DISK DRIVE HEAD PROXIMITY DETECTION IN A PREAMPLIFIER

(75) Inventors: Motomu Hashizume, Tokyo (JP); Hiroyuki Mukai, Kanagawa (JP); Naoko Jinguji, Kanagawa (JP); Toru Takeuchi, Kanagawa (JP)

(73) Assignee: Texas Instruments Incorporated, Dallas, TX (US)

( * ) Notice: Subject to any disclaimer, the term of this patent is extended or adjusted under 35 U.S.C. 154(b) by 146 days.

(21) Appl. No.: 11/848,849

(22) Filed: Aug. 31, 2007

(65) Prior Publication Data

US 2008/0285168 A1 Nov. 20, 2008

Related U.S. Application Data

(60) Provisional application No. 60/824,238, filed on Aug. 31, 2006.

(51) Int. Cl.
*G11B 27/36* (2006.01)
(52) U.S. Cl. .................. 360/31; 360/69; 360/75
(58) Field of Classification Search .............. None
See application file for complete search history.

(56) References Cited

U.S. PATENT DOCUMENTS

| 5,334,930 | A | * | 8/1994 | Onodera et al. | ......... 324/103 P |
| 5,838,509 | A | * | 11/1998 | Yun | ................. 360/46 |
| 6,310,739 | B1 | * | 10/2001 | McEwen et al. | ........... 360/25 |
| 2006/0012912 | A1 | * | 1/2006 | Jeong | .................. 360/75 |

* cited by examiner

*Primary Examiner*—Jason C Olson
(74) *Attorney, Agent, or Firm*—Dawn V. Stephens; Wade James Brady, III; Fredrick J. Telecky, Jr.

(57) ABSTRACT

Methods and apparatus to perform hard-disk drive head proximity detection in a preamplifier are described. One example method of detecting head position in a hard-disk drive includes obtaining a read signal from a head reading information from a disk; determining a signal envelope of the read signal; comparing the signal envelope to a first threshold to produce a first comparison; filtering the signal envelope; comparing the filtered signal envelope to a second threshold to produce a second comparison; combining the first comparison and the second comparison; and determining if the combination of the first comparison and the second comparison indicates head position oscillation.

20 Claims, 6 Drawing Sheets

METHODS AND APPARATUS TO PERFORM HARD-DISK DRIVE HEAD PROXIMITY DETECTION IN A PREAMPLIFIER

RELATED APPLICATIONS

This application claims the benefit of U.S. Provisional Application No. 60/824,238, filed Aug. 31, 2006, and hereby incorporates the same by reference.

TECHNICAL FIELD

The present disclosure pertains to computer systems and, more particularly, to methods and apparatus to perform hard-disk drive (HDD) head proximity detection in a preamplifier.

BACKGROUND

Hard-disk drives use one or more disks or platters that rotate about a spindle with respect to one or more heads, such as read and/or write heads. The read or write heads read information from or impart information to the disk platters, but do not, in desired operation, physically contact the platters. To the contrary, HDD heads are suspended above the spinning platters by mechanical suspensions. Periodical amplitude modulation on read signals may be caused from the drive head due to a variation in head-disk proximity that may result from mechanical oscillations of the suspension.

Recently, HDD heads have been designed to operate close to platters to communicate therewith. For example, a HDD read head may be positioned very close to a platter to read information from the platter via a reproduction signal. However, close HDD head proximity to the spinning platter increases the risk that the head may come in contact with the platter surface. Contact between a HDD head and a platter may cause performance degradation or destruction of the platter and/or head. An understanding of when a head is likely to contact a platter provides the ability to change operational aspects of the HDD to reduce or eliminate the risk of the head contacting the platter.

DETAILED DESCRIPTION

Figure 1:
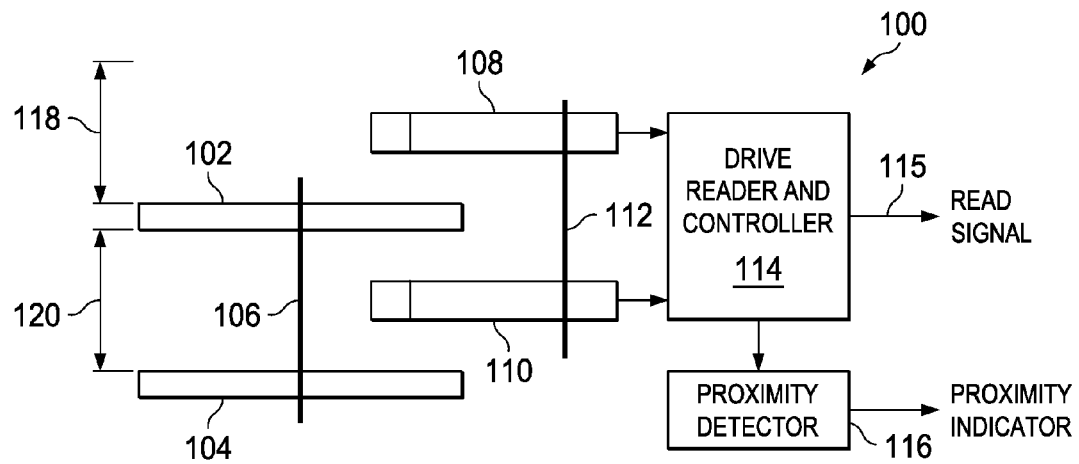
FIG. 1 is a diagram of a system including a HDD head proximity detector.

As shown in FIG. 1, a HDD system 100 of a computer may include one or more platters 102, 104 that spin about a spindle 106. One or more read or write heads 108, 110, which pivot about an axis 112, are provided above the platters 102, 104 for reading information from or writing information to the platters 102, 104.

In the read context, the heads 108, 110 are coupled to a drive reader and controller 114, which, as described below in detail, processes signals from the heads 108, 110 to produce a read signal 115. The read signal 115 may be passed to any number of different circuits that are provided in conjunction with processing signals from a HDD. Signals from the drive reader and controller 114 are also coupled to a HDD head proximity detector (hereinafter "proximity detector") 116, which, as described below, produces a proximity indication.

As described below in detail, the proximity detector 116 monitors the positions of a head or heads (e.g., the heads 108 and/or 110) with respect to the platters (e.g., the platters 102 and/or 104) to determine when the heads are likely to contact the platters. In particular, the proximity detector 116 processes signals from the drive reader and controller 114 to determine when the heads are oscillating vertically with respect to the platters (i.e., when the distance between the platters and the heads is varying). Such oscillation may be due to mechanical structures supporting the heads 108, 110 and is represented in FIG. 1 by the arrows 118 and 120. The oscillation of the heads 108, 110 precedes the heads 108, 110 contacting the platters 102, 104. Thus, if oscillations in the head proximity can be detected, corrective action may be taken to control the platters and the heads before the heads contact the platters. For example, when a head begins oscillating with respect to the platter, the platter spin speed may be changed to prevent such oscillations from increasing to a point at which the heads contact the platters.

Figure 2:
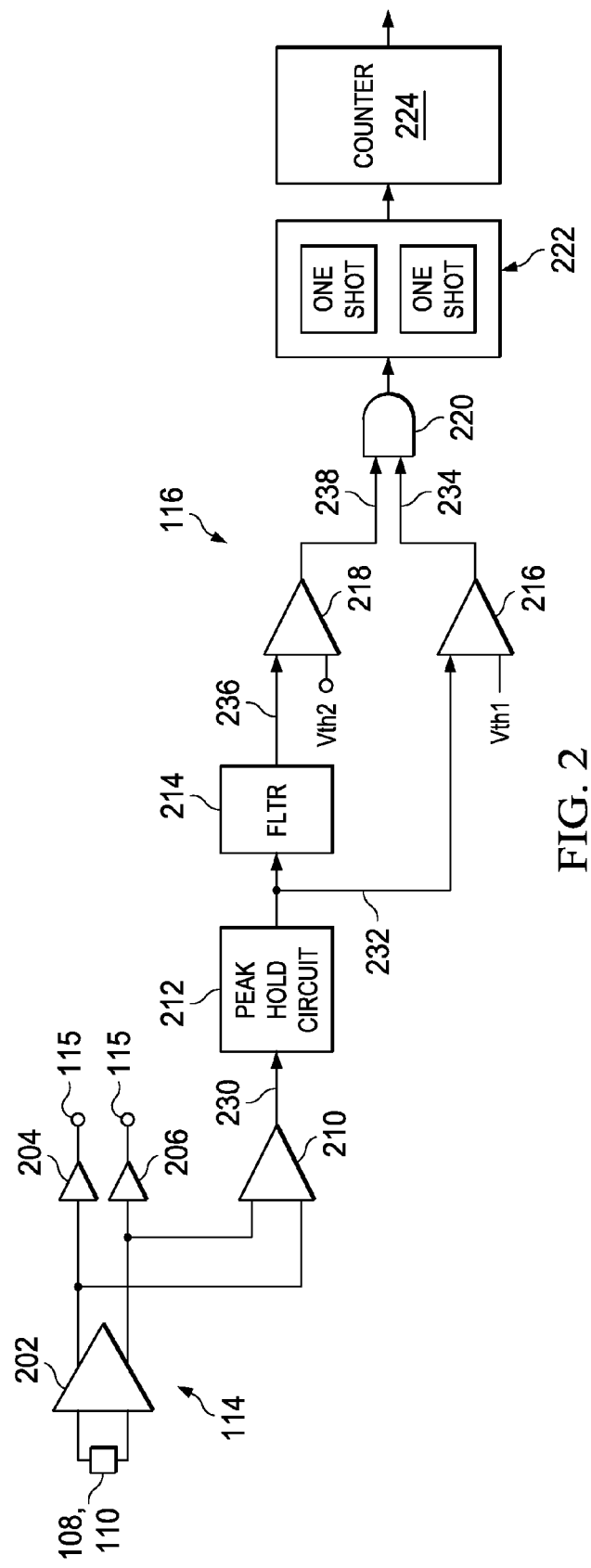
FIG. 2 is schematic diagram showing additional detail of the drive reader and controller and the proximity detector of FIG. 1.

As shown in further detail in FIG. 2, the drive reader and controller 114 may include a number of discrete or integrated components. In one example, the drive reader and controller 114 may include a first differential amplifier 202 that receives differential signals from a read head (e.g., one of the heads 108 and 110). In one simplified example, each differential output from the amplifier 202 is coupled to a buffer 204, 206. The read signal 115 is taken from the outputs of the buffers 204, 206. Of course, as will be readily appreciated by those having ordinary skill in the art, the drive reader and controller 114 may include other discrete or integrated components that are not shown in FIG. 1 for the sake of clarity.

As shown in FIG. 2, in one example implementation the proximity detector 116 is also coupled to the output of the amplifier 202. The example proximity detector 116 of FIG. 2 includes an amplifier 210, a peak hold circuit 212, and a filter 214, which may be implemented as a high pass or band-pass filter. The example proximity detector 116 also includes a pair of comparators 216, 218. The comparator 216 compares an output from the peak hold circuit 212 to a threshold (Vth1) and the comparator 218 compares the output from the filter 214 to a second threshold (Vth2). The outputs of the comparators 216, 218 are provided to an AND gate 220, the output of which is coupled to a digital band-pass filter 222 having an output coupled to a counter 224.

As described below, the peak hold circuit 212 produces an output signal that is the positive envelope of the signal from the amplifier 210. The peak hold circuit 212 may be implemented using an integrated circuit and/or a transistor having an emitter that is connected to ground through a resistor/capacitor parallel combination. Thus, in a sense the peak hold circuit may operate as a low pass filter that tracks the peaks of the signal from the amplifier 210.

As noted above, the filter 214 may be a high pass filter or may be a band-pass filter. In one example implementation, the filter 214 may exclude high and direct current (DC) frequencies. In another example implementation, the filter 214 may be a high pass filter that excludes only high frequency signals.

Figure 3:
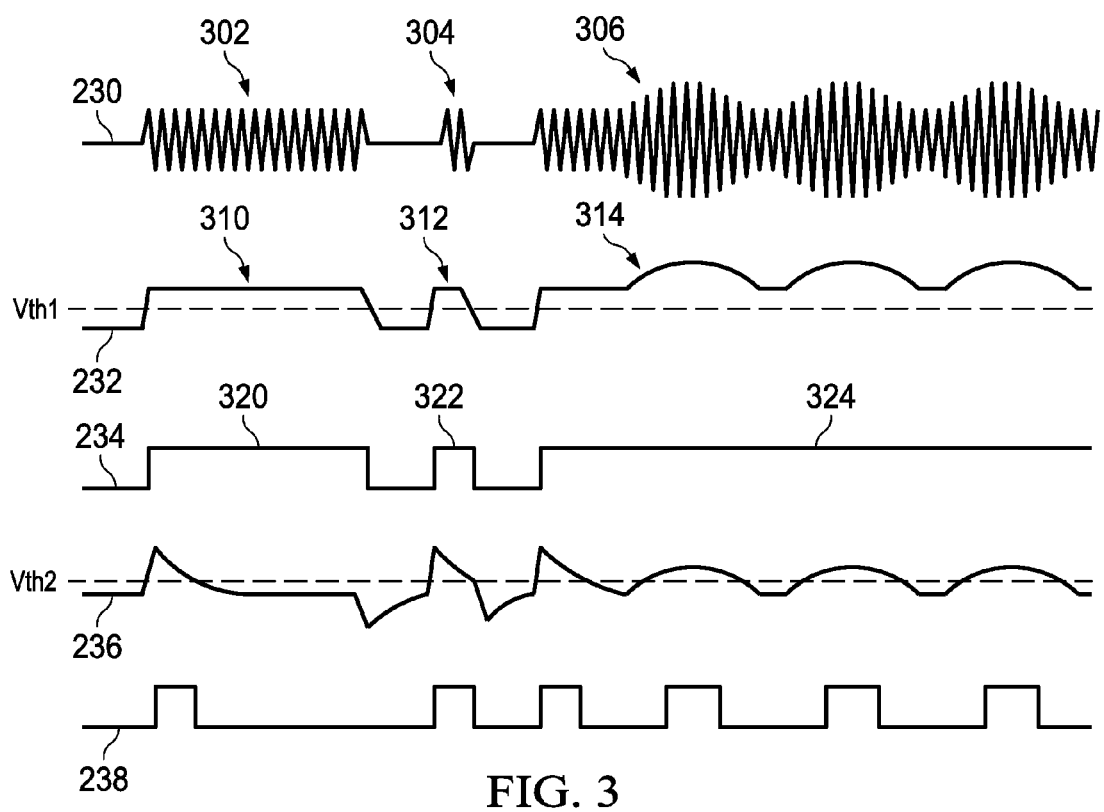
FIG. 3 is plot of various electrical signals against time in a functioning circuit constructed in accordance with the schematic of FIG. 2.

The operation of the proximity detector 116 of FIG. 2 is now described in conjunction with the waveforms shown in FIG. 3. In particular, a number of nodes shown in FIG. 2 include reference numerals and the signals shown in FIG. 3 are labeled with numbers that correspond to the nodes in FIG. 2. The output of the amplifier 210, as shown at 230 in FIG. 3, includes a first data area 302, a gap-ID area 304, which may be referred to as a non-data area, and a second data area 306. As shown in FIG. 3, the second data area 306 includes an amplitude varying as a function of time, which represents modulation or oscillations that is present on the information signal within the second data area 306 due to head proximity variation that may be caused by, for example, mechanical structures supporting the heads 108, 110, and/or the head and platter interaction.

The output signals from the amplifier 210, which is shown at reference numeral 230 is passed to the peak hold circuit 212, which produces an output signal at a node identified by reference numeral 232. The signal present at node 232 is shown at reference numeral 232 in FIG. 3. As shown in FIG. 3, the signal 232 is a signal that tracks the voltage peaks of the signal 230. Therefore, the first data area 302 results in a first high signal portion 310, the gap-ID area 304 results in a second high signal portion 312, and the second data area 306 results in a second high signal portion 314.

Subsequently, the comparator 216 compares the signal 232 to the first threshold Vth1 to result in an output signal shown at reference numeral 234. As shown in FIG. 3, the signal 234 is essentially a squared-up version of the signal 232. That is, the signal 234 includes first, second, and third high portions 320, 322, 324 corresponding to the first, second, and third high portions 310, 312, and 314 of the signal 232. Because the modulation or oscillation in the second data area 306 results in peaks that are above the first threshold Vth1, the third high portion 324 is at a constant high level. Further, as shown in FIG. 3, the signal 234 includes gaps on either side of the second high portion 322. These gaps correspond with the gaps in the gap-ID area 304 of the signal 230.

The signal 232 output from the peak hold circuit 212 is also coupled to the filter 214. The filter 214 produces an output signal 236 as shown in FIG. 3. In particular, the signal 236 includes high and low peaks corresponding to relatively fast or sharp changes in the signal 232. The portions of the signal 232 that track the envelope of the modulation or oscillation in the amplitude of the signal 230 also appear in the signal 236 because they are not removed by the filter 214.

The signal 236 from the filter 214 is compared to the second threshold Vth2 by the comparator 218 to produce a comparator output signal 238. As shown in FIG. 3, any portion of the signal 238 that exceeds the second threshold Vth2 results in a logical one, or a high voltage level. Thus, the positive-going envelope transitions in the signal 230 eventually result in digital pulses in the signal 238. This includes the positive-going transitions produced by the amplitude modulation on the envelope of the second data area 306.

The AND gate 220 logically ANDs the signals 234 and 238 to result in a signal that will be further processed to determine if there are oscillations in head proximity. In general, the comparison performed by the first comparator 216 clarifies the data area by ensuring that the signal in the gaps of the gap-ID area 304 remains a logical zero, or has a low value. By ANDing the output of the first comparator 216 with the signal from the second comparator 218, the system ensures that the gap plays no role in the determination of the periodicity of pulses. In one example, the further processing may look for certain attributes of the signal 238 to determine if oscillations in head proximity are present.

Figure 4:
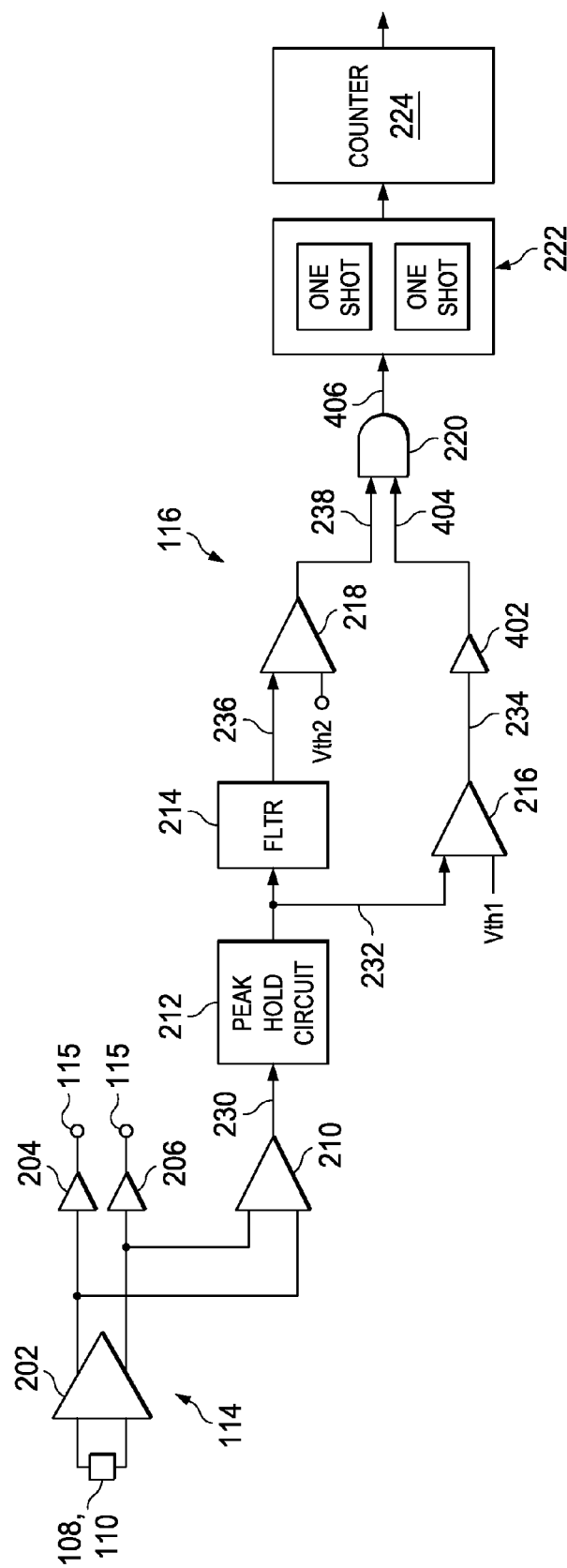
FIG. 4 is schematic diagram showing additional detail of an alternative implementation the drive reader and controller and the proximity detector of FIG. 1.

An alternate configuration of a proximity detector 114 is shown in FIG. 4. The proximity detector of FIG. 4 is substantially similar to the proximity detector of FIG. 2, except that the proximity detector of FIG. 4 includes a delay 402 coupled to the output of the comparator 216 and providing an input signal to the AND gate 220.

In operation, the delay 402 may have a value such as, for example, 5 microseconds ($\mu$s) and is responsive only to rising edges. That is, after the receipt of a rising edge, the delay blocks all signals from the comparator 216 to the AND gate 220 until the delay has expired. In general, the purpose of the delay 402 is prevent the AND gate 220 from receiving portions of the signal 234 thereby preventing the AND gate 220 from seeing the second high portion 322 (because the high portion 322 is shorter than the delay), as well as the beginning portions of the high portions 320 and 324.

Figure 5:
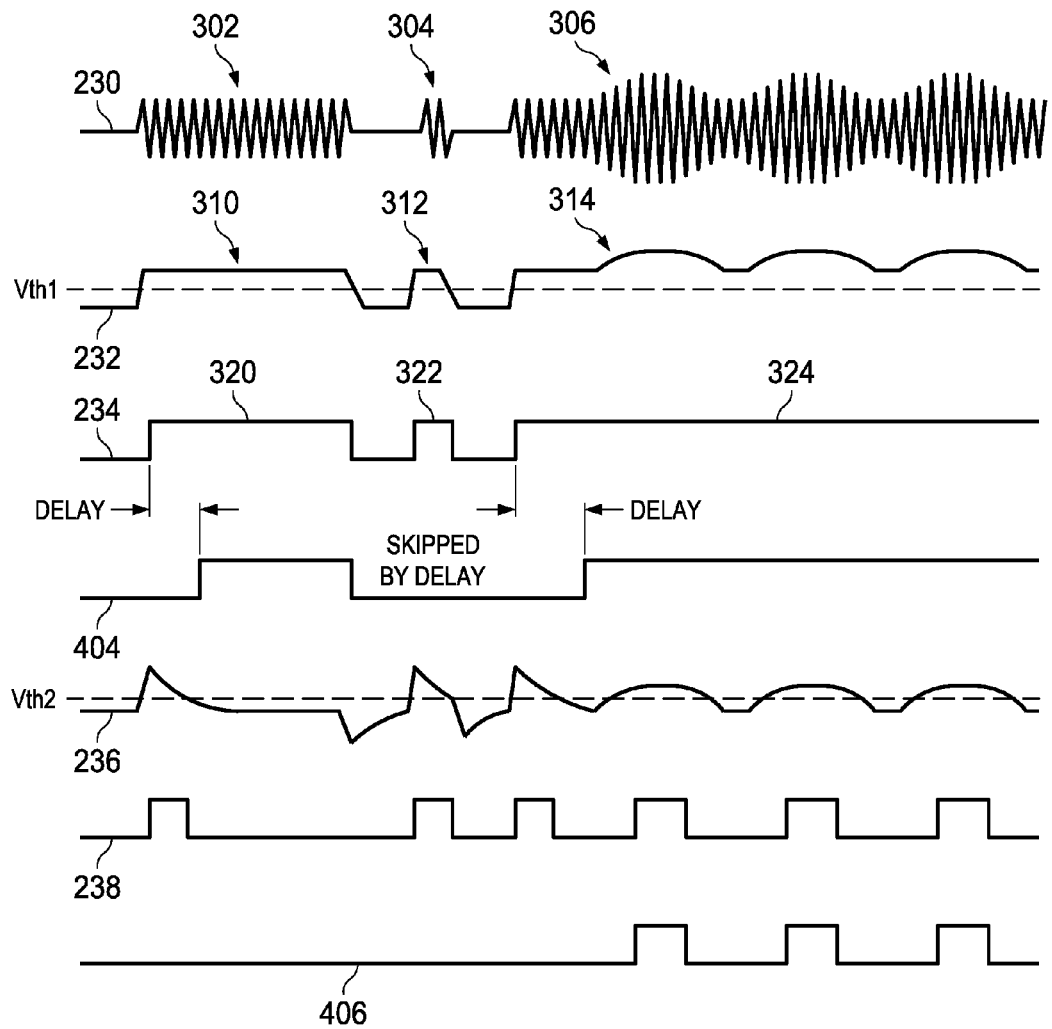
FIG. 5 is plot of various electrical signals against time in a functioning circuit constructed in accordance with the schematic of FIG. 4.

As shown in FIG. 5, the signal 404 is a time delayed version of the signal 234, wherein the time delay causes the signal 404 to omit portions of the signal 234. For example, the high portions 320 and 324 are shortened and the high portion 322 is omitted all together. When ANDed with the signal 234, the signal 404 causes the output of the AND gate 220 only to be high when the portions of the signal 234 corresponding to the oscillations or amplitude modulations are present. Thus, the results of the ANDing operation, which are shown at 406 of FIG. 5, represent only the oscillations or modulations that are present in the signal 230.

As described above, the output from the AND gate 220 is coupled to the digital band-pass filter 222 and the counter 224 for further processing. The digital band-pass filter 222 and the counter 224 look for particular periodicities in the pulses from the AND gate 220. When pulses from the AND gate 220 occur a given timings, it is presumed that there oscillations in head proximity. The processing of the signals from the AND gate 220 is described below in conjunction with FIG. 6.

Figure 6:
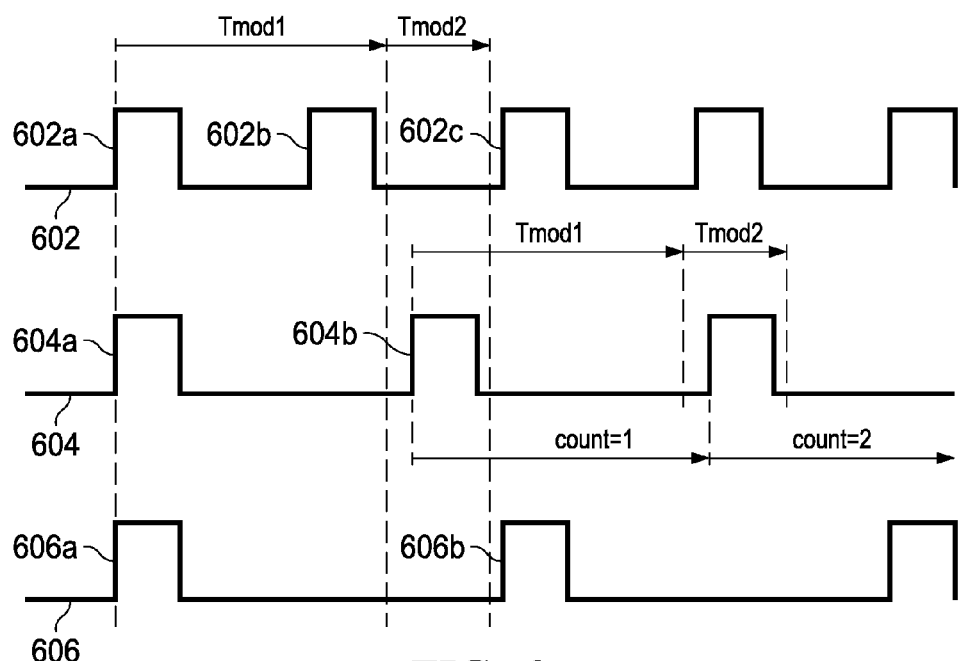
FIG. 6 is a plot of various logic signals shown in relation to timing parameters used within the digital band-pass filter of FIG. 5.

Turning now to FIG. 6, example waveforms are shown at reference numerals 602, 604, and 606. The waveforms 602, 604, and 606 represent output signals from the AND gate 220 of FIG. 4. A first rising edge in the waveforms 602, 604, 606 causes the digital band-pass filter 222, which may be implemented using two one-shot timers (and/or other forms of timing logic) to start a first timing period, referred to as Tmod1. The rising edges of the waveforms 602, 604, and 606, are respectively referred to using reference numerals 602a, 604a, and 606a. At the expiration of Tmod1, a second timing period, referred to as Tmod2, is started. According to one example, the timings of Tmod1 and Tmod2 both may be 4 $\mu$s for a data modulation frequency of 125 kilohertz (Khz) to 250 Khz, wherein a typical modulation frequency is 200 Khz. Of course, the timing periods, or time constants, for the one-shot circuits generating Tmod1 and Tmod2 may be programmable so that Tmod1 and Tmod2 could be altered to operate with different modulation frequencies, temperatures, or operating conditions. The programmability of the timing periods renders the pass-band programmable. The counter 224 keeps track of consecutive rising edges, one of which occurs within Tmod1 and one of which occurs during Tmod2.

As shown in conjunction with the signal 602, after the first rising edge 602a is received, if a second rising edge 602b is received by the digital band-pass filter 222 during Tmod1, the counter 224 keeping track of successive rising edges having the proper spacing (i.e., one and only one rising edge occurring during Tmod1 and one and only one rising edge occurring during Tmod2) is reset. After the expiration of Tmod2, the next rising edge 602c will restart the timing period Tmod1.

As shown in the waveform 604, the first rising edge 604a starts Tmod1 and a second rising edge 604b occurs during the timing period Tmod2. The receipt of the second rising edge 604b during Tmod2 causes the counter 224 to be incremented and also causes a subsequent timing period Tmod1 to be started. This process of receiving rising edges during Tmod1 and Tmod2 will continue as long as the head proximity is oscillating with periodicity and thereby causing the properly spaced pulsed owning to the oscillations in the read signal and, thus, the counter 224 will increment during oscillations of the drive heads.

As shown in the waveform 606, the first rising edge 606a starts Tmod1. At the end of Tmod1, Tmod2 begins, but no rising edge is received during Tmod2. However, when a subsequent rising edge 606b is received after the expiration of Tmod2, the counter 224 is reset to a count of zero, which indicates that the periodicity of the signals received is not indicative of an operation having oscillations.

Thus, the combination of Tmod1 and Tmod2 operates as a digital filter looking for two pulses, having spacing such that one of which occurs during Tmod1 and one of which occurs during Tmod2.

Of course, various actions may be taken in response to counter values. For example, drive speed may be reduced in response to the counter 224 reaching a particular value because such a value indicates that the head is oscillating in its proximity to the disk surface. To this end, one or more other entities, such as disk controllers, etc. may read the counter status.

Figure 7:
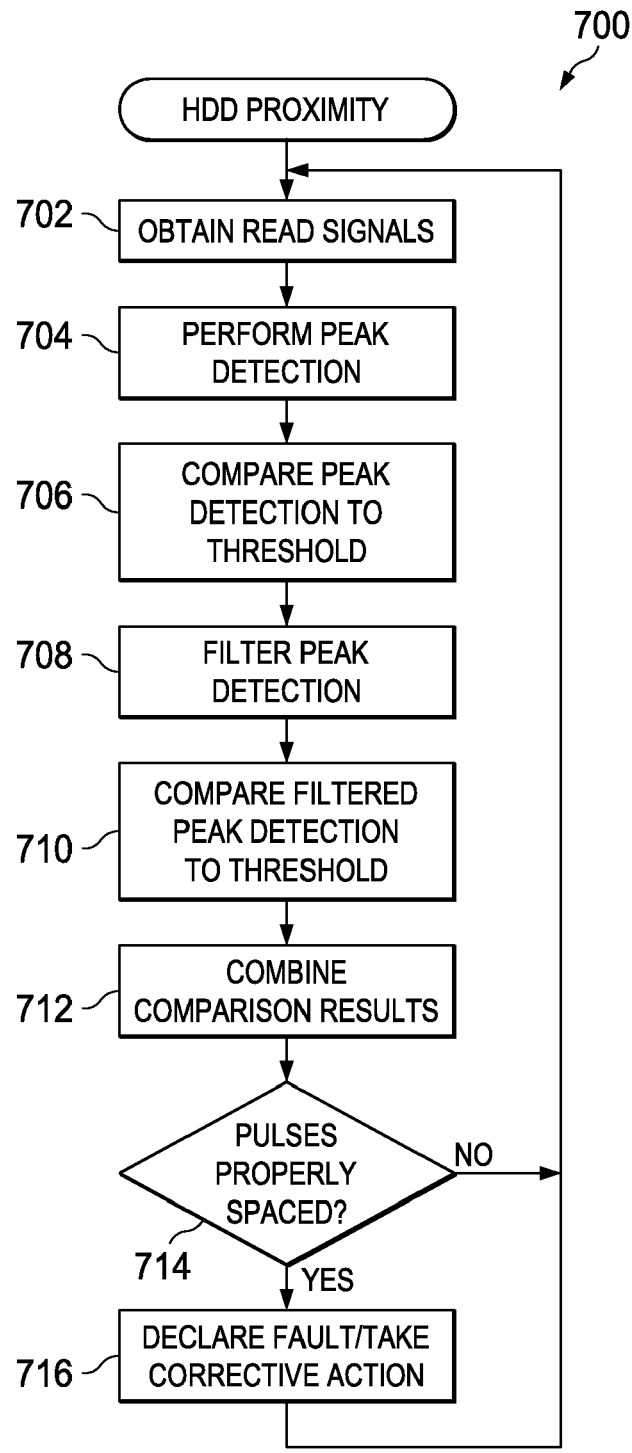
FIG. 7 is a flow diagram of an example HDD head proximity detection process.

As shown in FIG. 7, a HDD proximity process 700 obtains read signals (block 702) and performs peak detection on the read signals (block 704), which may result in a waveform similar to the waveform 232 of FIGS. 3 and 5. In a first comparison, the process 700 compares the peak detection to a first threshold (block 706). The results of the comparison may be similar to the waveform shown at reference numeral 234 of FIGS. 3 and 5.

Subsequently, the peak detection is filtered by, for example, a high pass filter or a band-pass filter (block 708). The filtered peak detection is then compared to a second threshold (block 710), which may result in a signal such as the signal shown at reference numeral 238 of FIGS. 3 and 5.

The comparison results from blocks 706 and 710 are then combined by, for example, a logical AND function (block 712). Of course, as described above in conjunction with FIGS. 4 and 5, the combination may include delaying, shortening, or omitting one or more of the signals to be compared. The process 700 then determines if the pulses of the combined comparison results are properly spaced to indicate head oscillation (i.e., if the pulses have the proper frequency) (block 714). As described above in conjunction with FIG. 6, this determination may be made using a digital band-pass filter 222 that may be implemented using one-shot timers that may be programmable. If the pulses are properly spaced, the process 700 continues and may, optionally, increment a counter indicating the number of properly spaced pulses that have been received and may indicate a fault or other condition upon which action may be taken (block 716). Corrective action may include changing drive speed or modifying other operational aspects of the drive system. In the alternative, if the pulses are not properly spaced, the process 700 continues to operate.

The foregoing process may be implemented using hardware, software, firmware, or any suitable combination thereof. For example, the forgoing process may be implemented using the circuit diagrams described herein or may be implemented using a processor, such as a digital signal processor or the like, programmed with software or other instructions.

Although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A method of detecting head position in a hard-disk drive, the method comprising:
   obtaining a read signal from a head reading information from a disk;
   determining a signal envelope of the read signal;
   comparing the signal envelope to a first threshold to produce a first comparison;
   filtering the signal envelope;
   comparing the filtered signal envelope to a second threshold to produce a second comparison;
   combining the first comparison and the second comparison; and
   determining if the combination of the first comparison and the second comparison indicates head position oscillation.

2. The method of claim 1, wherein filtering the signal envelope comprises at least one of high pass filtering or low pass filtering.

3. The method of claim 1, wherein combining the first comparison and the second comparison comprises a logical AND function.

4. The method of claim 1, further comprising omitting a portion of the first comparison prior to combining the first comparison and the second comparison.

5. The method of claim 4, wherein omitting the portion of the first comparison comprises a delay.

6. The method of claim 4, wherein omitting the portion of the first comparison comprises omitting information not indicative of oscillations in the head position.

7. A hard-disk drive head position detector comprising:
   a peak detector configured to receive a read signal via a hard-disk drive head and to determine an envelope of the read signal;
   a first comparator configured to compare the signal envelope to a first threshold to produce a first comparison;
   a filter to filter the signal envelope;
   a second comparator to compare the filtered signal envelope to a second threshold to produce a second comparison;
   logic to combine the first comparison and the second comparison; and
   a digital band-pass filter to determine if the combination of the first comparison and the second comparison indicates head position oscillation.

8. The hard-disk drive head position detector of claim 7, wherein the filter comprises one or more of a high pass filter or a low pass filter.

9. The hard-disk drive head position detector of claim 7, wherein the logic comprises a logical AND function.

10. The hard-disk drive head position detector of claim 7, further comprising a delay to omit a portion of the first comparison prior to the logic combining the first comparison and the second comparison.

11. The hard-disk drive head position detector of claim 10, wherein the delay omits a portion of the first comparison that is not indicative of oscillations in the head position.

12. The hard-disk drive head position detector of claim 7, wherein the digital band-pass filter comprises first and second one-shot timers.

13. The hard-disk drive head position detector of claim 12, wherein the digital band-pass filter determines whether a pulse train indicative of the combination of the first comparison and second comparison includes pulses that fall with time intervals provided by the first and second one-shot timers.

14. The hard-disk drive head position detector of claim 13, further comprising a counter to count the number of consecutive pulses that fall within the time intervals provided by the first and second one-shot timers.

15. A hard-disk drive system comprising:
a hard-disk drive platter;
a hard-disk drive read head configured to read information from the hard-disk drive platter and to produce a read signal;
a peak detector configured to receive the read signal and to determine an envelope of the read signal;
a first comparator configured to compare the signal envelope to a first threshold to produce a first comparison;
a filter to filter the signal envelope;
a second comparator to compare the filtered signal envelope to a second threshold to produce a second comparison;
logic to combine the first comparison and the second comparison; and
a digital band-pass filter to determine if the combination of the first comparison and the second comparison indicates head position oscillation.

16. The hard-disk drive system of claim 15, further comprising a delay to omit a portion of the first comparison prior to the logic combining the first comparison and the second comparison.

17. The hard-disk drive system of claim 16, wherein the delay omits a portion of the first comparison that is not indicative of oscillations in the head position.

18. The hard-disk drive system of claim 15, wherein the digital band-pass filter comprises first and second one-shot timers.

19. The hard-disk drive system of claim 18, wherein the digital band-pass filter determines whether a pulse train indicative of the combination of the first comparison and second comparison includes pulses that fall with time intervals provided by the first and second one-shot timers.

20. The hard-disk drive system of claim 19, further comprising a counter to count the number of consecutive pulses that fall within the time intervals provided by the first and second one-shot timers.

* * * * *